Figure 1:
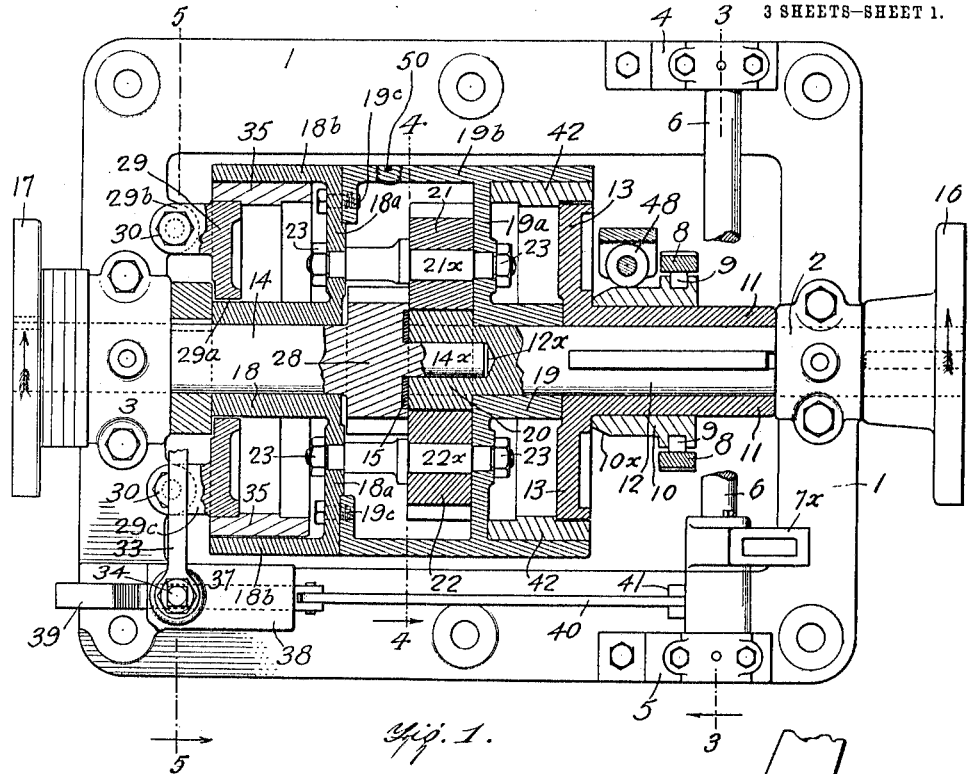

F. J. ROBINSON.
BRAKING DEVICE FOR REVERSIBLE GEAR MECHANISM.
APPLICATION FILED FEB. 8, 1912.

1,105,377.

Patented July 28, 1914.

3 SHEETS—SHEET 1.

WITNESSES

INVENTOR
FREDERICK J. ROBINSON,
BY
ATTORNEYS

F. J. ROBINSON.
BRAKING DEVICE FOR REVERSIBLE GEAR MECHANISM.
APPLICATION FILED FEB. 8, 1912.
1,105,377.
Patented July 28, 1914.
3 SHEETS—SHEET 2.
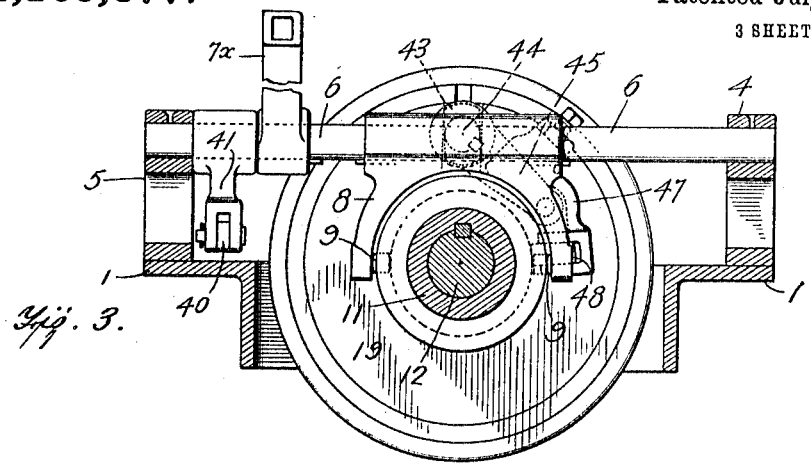
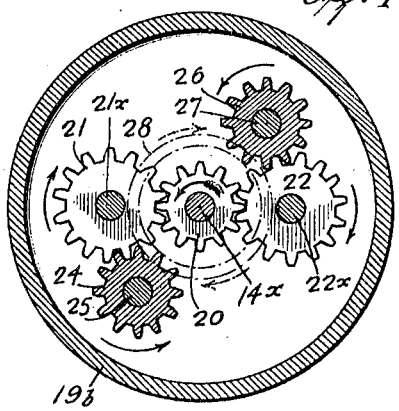
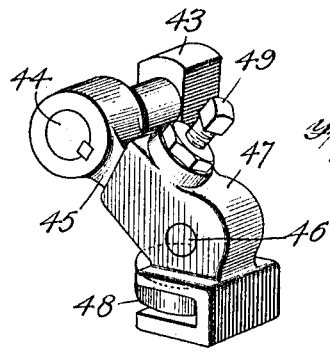
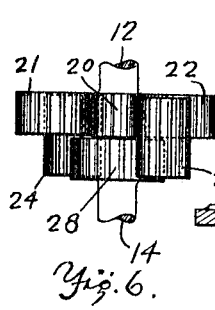
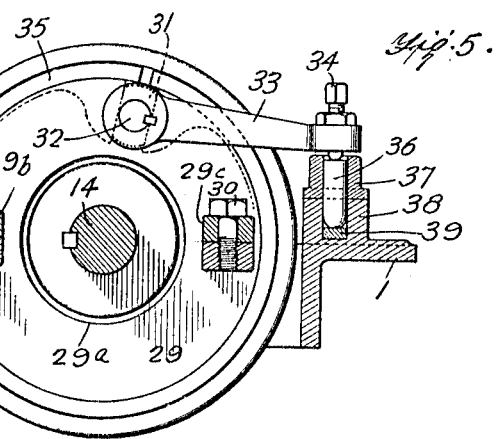
WITNESSES
INVENTOR
FREDERICK J. ROBINSON,
BY
ATTORNEYS

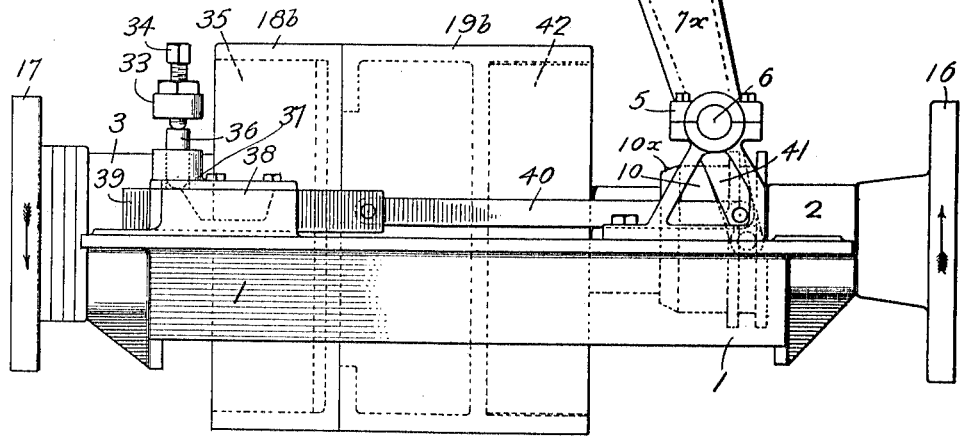
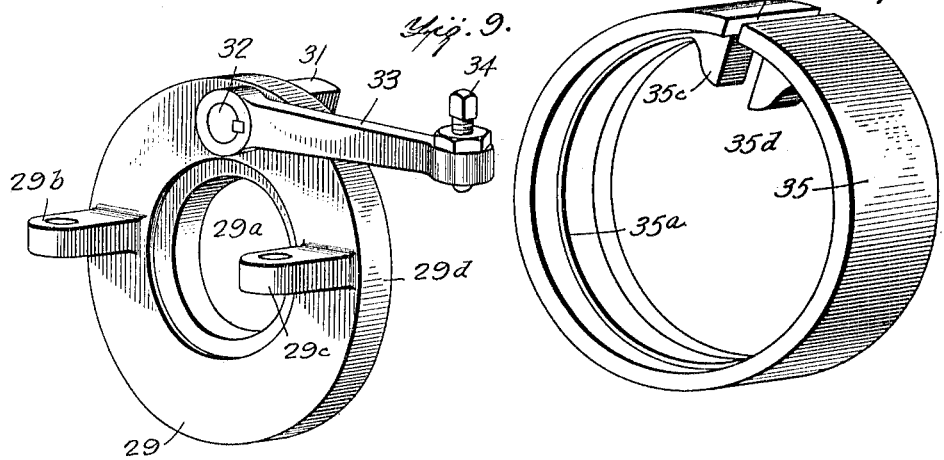

UNITED STATES PATENT OFFICE.

FREDERICK J. ROBINSON, OF HAMPTON, VIRGINIA.

BRAKING DEVICE FOR REVERSIBLE GEAR MECHANISM.

1,105,377.          Specification of Letters Patent.       Patented July 28, 1914.

Application filed February 8, 1912. Serial No. 676,244.

*To all whom it may concern:*

Be it known that I, FREDERICK J. ROBINSON, a citizen of the United States, and a resident of Hampton, in the county of Elizabeth City and State of Virginia, have made certain new and useful Improvements in Braking Devices for Reversible Gear Mechanism, of which the following is a specification.

My invention relates to improvements in transmission mechanism, more particularly in braking devices for reversing gear mechanism and it consists in the combinations, constructions, and arrangements herein described and claimed.

An object of my invention is to provide a braking mechanism for reversing gears in which a spring ring is so disposed with relation to a drum that the ring may be brought into contact with the drum at all points on its periphery when actuated and when free from the drum it may spring entirely away from the drum.

A further object of my invention is to provide a braking mechanism of the type described in which the ring when free from the drum is supported in position to again be brought into contact with the drum by a slight movement.

A further object of my invention is to provide a device of the type described having means for positively operating the ring so as to produce a maximum braking effect.

Other objects and advantages will appear in the following specification, and the novel features of the device will be particularly pointed out in the appended claims.

My invention is illustrated in the accompanying drawings forming part of this application in which similar reference characters indicate like parts in the several views and in which—

Figure 2:
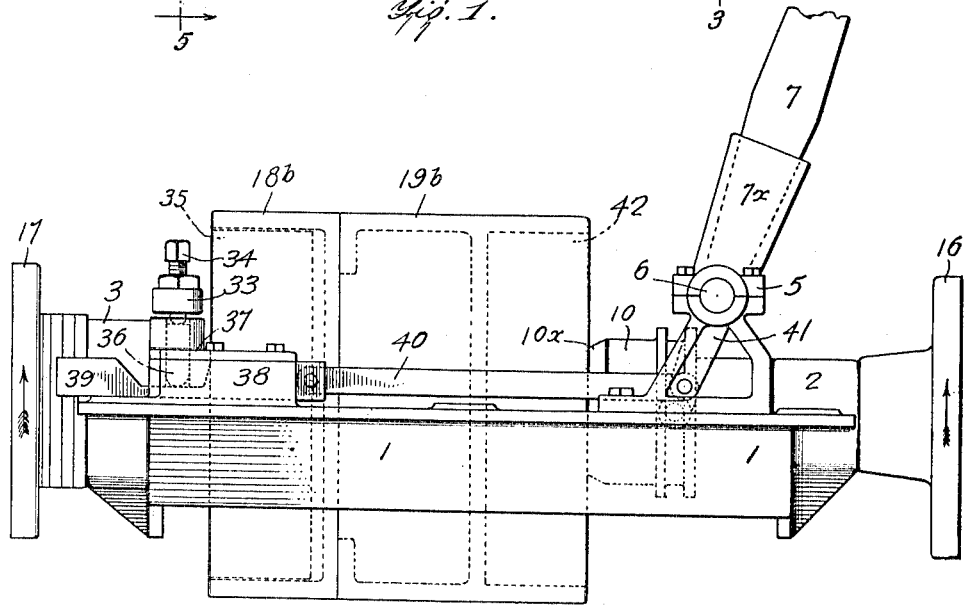

Figure 1 is a horizontal section through the device along the line of the main driving shaft and the driven shaft, Fig. 2 is a side view of the device, Fig. 3 is a section along the line 3—3 of Fig. 1 looking in the direction of the arrow, Fig. 4 is a section along the line 4—4 of Fig. 1, looking in the direction of the arrow, Fig. 5 is a section along the line 5—5 of Fig. 1, looking in the direction of the arrow, Fig. 6 is a detail plan view of the gears shown in Fig. 4, Fig. 7 is a perspective view of a wedge member for expanding one of the split rings, Fig. 8 is a side view similar to Fig. 2, but showing the operating lever in another position, Fig. 9 is a perspective view of a rotatable collar with wedge attached, and Fig. 10 is a perspective view of one of the split expansion rings.

In carrying out my invention I provide a rectangular base 1 provided with bearings 2 at one end thereof, and similar bearings 3 at the other end. One of the side members of the base 1 is provided with bearings 4, directly opposite bearings 5 on the other side member of the base, and in bearings 4 and 5 is journaled the shaft 6 to which the operating lever 7 is secured, the latter fitting in the socket $7^x$.

In Fig. 3 it will be seen that a yoke 8 is keyed to the shaft 6 and the arms of the yoke are provided with pins 9 arranged to enter an annular groove in a slidable member 10 carried by a sleeve 11, which is keyed to the drive shaft 12. The sleeve 11 has an integral head 13, as will be seen from Fig. 1. The drive shaft 12 is provided with a central recess $12^x$ in its inner end, arranged to receive a centering pin $14^x$ of the driven shaft 14, the end of the drive shaft 12 engaging a bearing ring or gasket 15 disposed in the end of the driven shaft 14. Collars 16 and 17 are secured upon the outer ends of the drive shaft 12 and the driven shaft 14 respectively, thereby holding these shafts in position.

The outer drum, which forms one of the friction clutch members, is really made in two parts which are bolted together in the manner hereinafter described. One end of the drum has a hub portion 18 which is loosely mounted on the shaft 14, and is provided with a radially extending portion $18^a$ and an outer annular integral portion $18^b$. The other part of the drum consists of a hub portion 19 rigidly mounted on the driving shaft 12. It is provided with a radially extending portion $19^a$, and with a rim portion $19^b$ whose outer edge is flush with the rim portion $18^b$ of the other part of the drum. In order that the two portions of the drum may come into exact alinement the rim portion $19^b$ is provided with an inwardly extending flange $19^c$ arranged to fit in a recess in the radially extending portion $18^a$, as shown in the drawings.

Referring now to Figs. 1 and 4, it will be seen that the driving shaft 12 is provided at its inner end with an integral gear 20, which is arranged to mesh with the gears 21 and 22 on each side of it. These gears 21 and 22 are on the reduced portion of the stub shafts 21ˣ and 22ˣ respectively. The stub shafts are both threaded at both ends for the reception of nuts 23, which hold the stub shafts in place and which bolt the two parts of the drum together as clearly seen in Fig. 1.

Referring now to Figs. 4 and 6, it will be seen that the gear 21 is in mesh with a gear 24, which is loosely mounted on a shaft 25. The gear 22 is similarly in mesh with a gear 26 carried on a shaft 27, and the two gears 24 and 26 are in mesh on opposite sides with a gear 28, which forms an integral part of the driven shaft 14.

Referring now particularly to Fig. 9, I have shown therein a disk 29 having a central opening 29ᵃ through which the hub portion 18 projects. The disk is provided with lugs 29ᵇ and 29ᶜ which are attached to the base 1 by means of the bolts 30, as shown in Fig. 1. A wedge member 31 having a reduced cylindrical portion 32 is mounted to rotate on said reduced portion 32 in one edge of the disk 29 (see Fig. 9) and an arm 33 is keyed to the portion 32 on the opposite side of the disk and is provided with a set screw 34. The split expansion ring 35 shown in Fig. 10 is disposed within the rim 18ᵇ (see Fig. 1), one edge of the ring being between the disk 29 and the rim 18ᵇ. The ring is provided with a shoulder 35ᵃ which is arranged to be engaged by the edge 29ᵈ of the plate 29 so as to hold the expansion ring in place. At the point 35ᵇ where the ring is split are the inwardly projecting lugs 35ᶜ and 35ᵈ, space being provided between the lugs to admit the wedge member 31, Figs. 9 and 10 showing the relative position of the wedge and the lugs before the plate 29 is slipped into the ring 35. Referring now to Figs. 2 and 5, it will be seen that the end of the set screw 34 is arranged to rest on a pin 36 in an opening in a guide member 37. The guide member 37 rests upon a lower guide member 38 having a slot at right angles to the opening in the member 37, and through which a portion of a cam member 39 passes. This cam member is adapted to slide in the guide member 38 and is actuated by a link 40 (see Fig. 2) which is secured to a downwardly extending arm 41 fastened to the shaft 6 (see Figs. 2 and 3).

A split ring 42 similar to the ring 35 is provided for the opposite end of the drum and fits within the rim 19ᵇ as shown in Fig. 1, being held in position by means of the head 13 on the sleeve 11. The means for expanding the split ring is best shown in Fig. 7. This consists of a wedge member 43 having an integral reduced portion 44 arranged to extend through the head 19 (see Fig. 3). An arm 45 is keyed to the reduced portion 44 and is pivotally connected by means of a pin 46 to a housing 47 bearing a roller 48.

The housing 47 carries a set screw 49, one end of which bears on the arm 45 for the purpose of adjusting the relative position of the roller 48 with respect to the arm 45.

From the foregoing description of the various parts of the device the operation thereof may be readily understood.

As stated previously the shaft 12 is the driving shaft and we will assume that it is revolving in the direction indicated by the arrow in Fig. 1. It will be apparent, then, that the gears 20, 21, 22, 24, 26 and 28 will revolve in the directions indicated in Fig. 4, provided these gears revolve about fixed axes. In other words, the drum members 18ᵃ and 19ᵃ, which carry the shaft of the gears must be prevented from rotating. This is accomplished by shifting the lever 7 in the position shown in Fig. 8, thereby causing the cam member 39 to ride underneath the pin 36 (see Fig. 2) lifting the arm 33, rotating the wedge 31 (see Fig. 5) and expanding the split ring 35, so as to frictionally engage the drum. The wedge 31, as has been explained, however, is carried by the collar 29 which is rigidly attached to the frame and therefore the drum is held through the expansion split ring, the collar 29 and the frame. The result is that the driven shaft 14 will be revolved in the direction shown in Fig. 4, i. e., in an opposite direction to that of the driving shaft 12. In order to give the driven shaft movement in the same direction as the driving shaft, it will be necessary to communicate to the drum the movement of the driving shaft. This is accomplished by shifting the lever 7 into the position shown in Fig. 2. The revolution of the shaft 6 will cause the yoke 8 to move inwardly, thereby pushing the sleeve 10 toward the drum. It will be noted that the sleeve 10 is provided with a cam surface 10ˣ which will push the roller 48 outwardly, and will move the arm 45 (see Fig. 3) with it. This will cause the rotation of the reduced portion 44 of the wedge 43, and the latter being between the split ends of the expansion ring 43 (in precisely the same relation as the wedge 31 to the split ring 35) the split ring 42 will be expanded and will frictionally engage the drum portion 19ᵇ. The drum as a whole will then revolve, but it will be apparent that the revolution of the drum will cause the revolution of the gear 28 in the opposite direction from that which it would have if the drum were stationary, i. e., the revolution of the driven shaft will now be in the same direction as that of the driving shaft. This condition is shown in Fig. 1. It will be plain that the movement of the handle 7 will result in the expanding of one ring and in the simultaneous turning of the wedge of the other ring so as to permit the ring to contract. There is a point mid-way between the forward and reverse positions, as described, in which the drum will not be engaged by either of the expansion rings. This is the neutral position and will merely result in the gears turning idly within the drum around the gear 28 on the driven shaft. This shaft therefore will remain stationary.

It will be seen that I have provided a device having the most compact form in which the driven shaft may be given a forward or reverse motion or may be rendered idle by the mere shifting of one lever. In actual practice I provide a plug 50 in the drum which may be withdrawn and oil may be poured in the central compartment between the heads 18$^a$ and 19$^a$, so as to lubricate the gears. This results in the almost noiseless running of the device, besides making the gearing dustproof. It will further be seen that one feature of the device is that it is very compact, thereby taking up very little space.

I claim:—

1. In a reversing gear mechanism, a base, an annular plate rigidly secured to said base, a shaft arranged to pass through the center of said plate, a drum provided with a hub portion loosely disposed on said shaft, a split ring disposed on the interior of said drum and arranged to be supported by said plate, means carried by the plate for expanding the split ring to cause the engagement of the latter with the drum, said expanding means comprising a wedge disposed between the ends of said split ring, said wedge having a portion journaled in said plate, an arm rigidly secured to the journaled portion of said wedge, and means for engaging the end of the arm to rotate the wedge.

2. In a reversing gear mechanism, a base, a shaft carried upon said base, a drum provided with a hub loosely disposed on said shaft, an annular plate provided with lugs on one side thereof, means for attaching said lugs rigidly to said base, a split expansion ring having inwardly projecting lugs at its ends and being provided with an annular recess arranged to receive the annular plate for supporting the ring on the plate, a wedge rotatably carried by the plate on the side opposite the lugs, said wedge being arranged to enter between the lugs on the split ring, an arm rigidly secured to the pivotal portion of said rotatable wedge on the opposite side of the plate from the split ring, and means for moving the arm to cause the rotation of the wedge.

3. In a reversing gear mechanism, a base, an annular plate rigidly secured to said base, a shaft arranged to pass through the center of the plate, a drum provided with a hub portion loosely disposed on said shaft, a split ring disposed on the interior of said drum and arranged to be supported by said plate, means carried by the plate for expanding the split ring to cause the engagement of the latter with the drum, said expanding means comprising a wedge disposed between the ends of said split ring, said wedge having a portion journaled in said plate, an arm rigidly secured to the journaled portion of said wedge, and means for engaging the end of the arm to rotate the wedge.

FREDERICK J. ROBINSON.

Witnesses:
 RICHARD W. KEAR,
 S. JACKSON SCOTT.

---

Copies of this patent may be obtained for five cents each, by addressing the "Commissioner of Patents, Washington, D. C."